Oct. 9, 1928.　　　　　E. C. VAN DOORN　　　　　1,687,048
MOTION PICTURE FILM STRIP
Filed Aug. 23, 1926
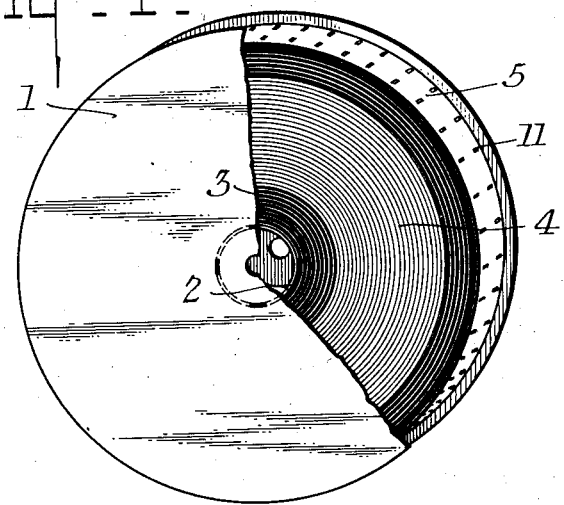
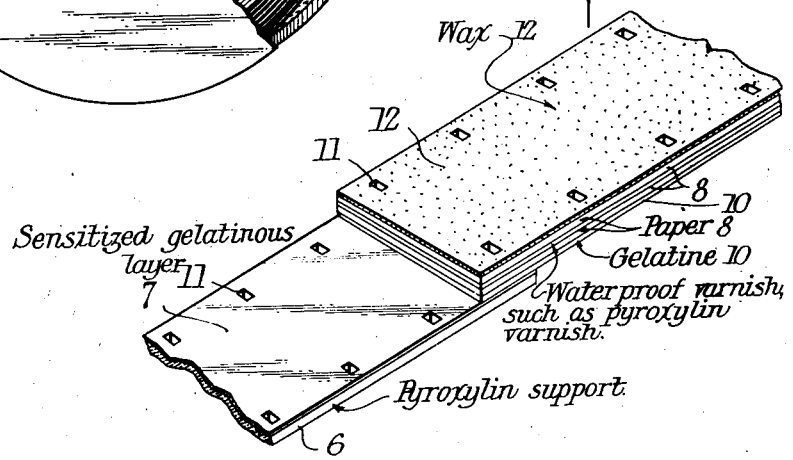
Edward C. Van Doorn,
INVENTOR.
BY
ATTORNEYS.

Patented Oct. 9, 1928.

1,687,048

UNITED STATES PATENT OFFICE.

EDWARD C. VAN DOORN, OF ROCHESTER, NEW YORK, ASSIGNOR TO EASTMAN KODAK COMPANY, OF ROCHESTER, NEW YORK, A CORPORATION OF NEW YORK.

MOTION-PICTURE FILM STRIP.

Application filed August 23, 1926. Serial No. 130,799.

This invention relates to motion picture film and more particularly to such film as is furnished in a cartridge for daylight loading in a camera.

As thus furnished, a typical cartridge comprises a reel having wound thereon a band of film with protective paper bands attached to the ends thereof. This may be used in cameras of various types, typical examples being shown in the patents to Tessier 1,572,252, granted Feb. 9, 1926, and Wittel 1,588,082, granted June 8, 1926.

In such apparatus, the film strip is fed in a self supported loop from a feeding means, such as a sprocket, to a gate through which it is advanced, and thence in another loop to a feeding means. At the gate, the film usually passes between spring pressed guide strips having apertures for the exposure and for the intermittent mechanism. There is a tendency for particles of emulsion to be scraped or dislodged from the sensitive layer and to be built up on the smooth guiding surfaces, thereby greatly increasing the friction between the film and the slideway, and also to pile up on the edge of the exposure window where it renders the edge of the exposed image rough and uneven. In a spring driven portable camera, this is particularly disadvantageous, as the springs are made as light as possible to increase the portability of the camera, and the increased friction due to this cause may become so great as practically to render the camera inoperative.

Another difficulty, sometimes encountered, is that the paper protective bands, having much less body than the film band, develop a tendency to buckle as they are being fed through the mechanism and do not maintain the self-supported loops. This is particularly liable to be the case where the film strip has been subjected to humid atmospheric conditions, tending to make the paper especially limp. Under such conditions, moreover, the protection afforded the film by the paper against atmospheric influences is lessened.

The objects of my invention are to furnish a protective band which will maintain its stiffness and resiliency at all times, will protect the sensitized film from moisture, will be readily attachable to the sensitized film band, and which will render the film easy sliding through the film gate.

The above and other objects are attained by a band composed of two sheets or strips of paper laminated together by a waterproofing varnish which to some extent penetrates and impregnates the paper strips from their facing surfaces and forms a stiffening layer between the strips. Such a band may be coated on one surface with gelatine and on the other with wax.

Reference will now be made to the accompanying drawing wherein the same reference characters designate the same parts throughout.

Fig. 1 is a perspective view of a reel of film embodying my invention, one flange being partly broken away.

Fig. 2 is a perspective view on an enlarged scale of a portion of the film strip including the junction of the sensitized portion and a protective portion.

Fig. 3 is an edge view of a similar fragment showing a modified form.

In Figs. 2 and 3 the thicknesses are much exaggerated.

The film cartridge, as furnished for camera use, comprises a reel having side flanges 1, and a core 2, upon which is wound a protective portion 3, coiled directly on the core, an unexposed sensitized film portion 4 attached at one end to the outer end of the protective portion 3 and an outer leader band or protective portion 5 attached at one end to the outer end of the coiled sensitized portion 4 and wound around it, the protective portions 3 and 5 thus forming continuations of the sensitized portion 4 and the three portions 3, 4 and 5 constituting in effect a single, coiled film strip having the usual perforations 11.

The sensitized portion consists, as is usual, of a support 6 of a plastic cellulosic product, such as any well known composition of cellulose ester, ether or the like, preferably cellulose acetate, upon one surface of which is a light sensitive gelatino-silver-halide layer 7.

The leader band 5 consists of two paper bands 8 adherently laminated together by a layer of waterprofing varnish 9, which is preferably of a pyroxylin type. The laminated band thus formed may be coated on one surface with gelatine 10, rendering it the more readily attachable to the sensitized gelatine layer 7, and on the other surface with wax 12. The waxed leader strip, being drawn through a camera prior to the passage of the sensitized portion 4, coats the slideway very lightly with wax and materially reduces the tendency of emulsion particles to be scraped off and the friction between the film and the guiding plate.

Any of the well known varnishes, particularly cellulose ester or ether varnishes may be used, a typical one that has been found satisfactory being the following:

|  | Parts by weight. |
|---|---|
| Cellulose nitrate | 100 |
| Fusel oil or butyl alcohol | 50 |
| Methyl alcohol | 900–1500 |
| Camphor | 10 |

This is, of course, given only by way of example as numerous other practicable formulæ are known.

The gelatine and wax layers may be omitted and the varnish laminated paper bands only used, such a modification being shown in Fig. 3. In such a case, glue could be used as the adhesive between the paper 8 and the gelatine 7. The varnish does not completely penetrate through the paper. It does, however, sufficiently stiffen it and protect it against the penetration of moisture to overcome the defects noted.

Care should be taken that the paper used is not too heavy or the varnish too thick, lest the final laminated strip be stiffer than is desirable. While it is desirable that the leader strip be sufficiently stiff to be self supporting in the loop under all conditions, it should not be so stiff as to cause excessive friction. Accordingly the paper used for both laminations should be thin and flexible and the varnish, which adds considerable stiffness, should be rather thin or dilute.

The specific forms herein disclosed are by way of example. It is obvious that numerous embodiments are possible, and I contemplate as within my invention all such modifications and equivalents as fall within the scope of the appended claims.

Having thus described my invention, what I claim as new and desire to secure by Letters Patent is:

1. A motion picture film strip including a band of sensitized material and a protective strip therefor comprising two co-extensive paper bands laminated together by a waterproof adhesive.

2. A motion picture film strip including a band of material sensitized upon one surface and a protective strip attached to one end thereof and forming a continuation thereof and comprising two co-extensive paper bands laminated together by a waterproof cellulosic adhesive, said protective strip having a coating of wax upon that surface which constitutes a continuation of the sensitive surface.

3. A motion picture film strip including a band of material having a sensitized, gelatinous coating on one surface and a protective band therefor and comprising two co-extensive paper bands laminated together by a waterproof cellulosic adhesive, and having one surface coated with gelatine, one end of the protective band being attached to one end of the sensitized band by adherence of the two gelatine coatings.

4. A motion picture film strip including a band of material having a sensitized, gelatinous coating on one surface and a protective band therefor and comprising two co-extensive paper bands laminated together by a waterproof cellulosic adhesive, and having one surface coated with gelatine, and the other surface coated with wax, one end of the protective band being attached to one end of the sensitized band by adherence of the two gelatine coatings.

5. As an article of manufacture, a strip of coiled material adapted for use in a motion picture camera and including a coiled band with an unexposed sensitized layer upon one surface and a protective strip attached at one end to the outer end of said coiled band and coiled around said band and comprising two co-extensive paper bands laminated together by a waterproof cellulosic adhesive.

6. As an article of manufacture, a strip of coiled material adapted for use in a motion picture camera and including a coiled band with an unexposed, sensitized, gelatinous layer upon one surface and a protective band attached at one end to the outer end of the coiled band and coiled around said band and comprising two co-extensive paper strips laminated together by a waterproof cellulosic adhesive, that surface of the protective band that constitutes a continuation of the sensitive surface having a coating of wax.

7. As an article of manufacture, a continuous single strip of coiled material adapted for use in a motion picture camera and including a coiled band comprising a cellulosic film support with an unexposed, sensitive, gelatinous layer upon one surface, and a protective band attached at one end to the outer end of said coiled band and coiled around said band, and comprising two co-extensive paper strips laminated together by a waterproof cellulosic adhesive, said protective band having a gelatine layer on one surface and a coating of wax on the other surface, the two bands being attached together by adherence of the gelatine layers.

Signed at Rochester, New York this 12th day of August, 1926.

EDWARD C. VAN DOORN.